(12) United States Patent
Antonacci

(10) Patent No.: US 11,060,915 B2
(45) Date of Patent: Jul. 13, 2021

(54) ARRANGEMENT FOR ENHANCING SPECTRAL CONTRAST OF A VIPA SPECTROMETER

(71) Applicant: FONDAZIONE ISTITUTO ITALIANO DI TECNOLOGIA, Genoa (IT)

(72) Inventor: Giuseppe Antonacci, Rome (IT)

(73) Assignee: FONDAZIONE ISTITUTO ITALIANO DI TECNOLOGIA

( * ) Notice: Subject to any disclaimer, the term of this patent is extended or adjusted under 35 U.S.C. 154(b) by 0 days.

(21) Appl. No.: 16/649,332

(22) PCT Filed: Sep. 7, 2018

(86) PCT No.: PCT/IB2018/056829
§ 371 (c)(1),
(2) Date: Mar. 20, 2020

(87) PCT Pub. No.: WO2019/064093
PCT Pub. Date: Apr. 4, 2019

(65) Prior Publication Data
US 2020/0232849 A1    Jul. 23, 2020

(30) Foreign Application Priority Data

Sep. 29, 2017   (IT) .................. 102017000109143

(51) Int. Cl.
*G01J 3/44*       (2006.01)
*G01J 3/02*       (2006.01)
*G01J 3/26*       (2006.01)

(52) U.S. Cl.
CPC .......... *G01J 3/4412* (2013.01); *G01J 3/0208* (2013.01); *G01J 3/0229* (2013.01); *G01J 3/26* (2013.01)

(58) Field of Classification Search
None
See application file for complete search history.

(56) References Cited

U.S. PATENT DOCUMENTS

| 2005/0046837 A1* | 3/2005 | Izumi | G02B 27/0087 356/326 |
| 2009/0273777 A1* | 11/2009 | Yun | G01J 3/26 356/300 |

(Continued)

OTHER PUBLICATIONS

International Search Report, issued in PCT/IB2018/056829, dated Jan. 15, 2019, Rijswijk, Netherlands.

(Continued)

*Primary Examiner* — Shawn Decenzo
(74) *Attorney, Agent, or Firm* — Valauskas Corder LLC

(57) ABSTRACT

A spectrometer is provided which comprises a Virtually Imaged Phased Array member configured to receive an electromagnetic input radiation and to generate an electromagnetic output radiation, in which a spectrum of the electromagnetic output radiation is dispersed along a dispersion axis (x) transverse to an optical axis (z) of propagation of the electromagnetic output radiation; a Fourier lens adapted to convert the output electromagnetic radiation into a spectral pattern; an image sensor adapted to detect the spectral pattern; and at least one diffraction mask arranged along the optical axis (z) for propagating the output electromagnetic radiation, in a position not coincident with a spectral plane of the spectrometer. Through the diffraction mask, which comprises a material blocking the transmission of the output electromagnetic radiation, an aperture is obtained which allows the transmission of the output electromagnetic radiation, and whose edge comprises at least one inclined segment.

8 Claims, 7 Drawing Sheets

(56) References Cited

U.S. PATENT DOCUMENTS

| | | | | |
|---|---|---|---|---|
| 2010/0328659 | A1* | 12/2010 | Bodkin | G01J 3/0229 |
| | | | | 356/326 |
| 2012/0302862 | A1* | 11/2012 | Yun | A61B 5/0068 |
| | | | | 600/398 |
| 2015/0219495 | A1 | 8/2015 | Garbos et al. | |
| 2017/0082491 | A1* | 3/2017 | Stephen | G02B 5/122 |
| 2019/0017870 | A1* | 1/2019 | Coffin | G01J 3/45 |
| 2019/0186992 | A1* | 6/2019 | Munch | G01J 3/14 |
| 2019/0335994 | A1* | 11/2019 | Yun | G01J 3/0218 |
| 2020/0182694 | A1* | 6/2020 | Scarcelli | G01J 3/18 |
| 2020/0278250 | A1* | 9/2020 | Scarcelli | G01J 3/0229 |

OTHER PUBLICATIONS

Giuliano Scarcelli et al., "Multistage VIPA etalons for high-extinction parallel Brillouin spectroscopy", Optics Express, May 23, 2011, pp. 10913-10922, vol. 19, No. 11, Optical Society of America, USA.

Eitan Edrei et al., "Integration of spectral coronagraphy within VIPA-based spectrometers for high extinction Brillouin imaging", Optics Express, Mar. 15, 2017, pp. 6895-6903, vol. 25, No. 6, Optical Society of America, USA.

* cited by examiner

ARRANGEMENT FOR ENHANCING SPECTRAL CONTRAST OF A VIPA SPECTROMETER

CROSS-REFERENCE TO RELATED APPLICATIONS

This application is a U.S. National Phase filing of PCT International Patent Application No. PCT/IB2018/056829, having an international filing date of Sep. 7, 2018, which claims priority to Italian Patent Application No. 102017000109143, filed Sep. 29, 2017 each of which is hereby incorporated by reference in its entirety.

FIELD OF THE INVENTION

The present invention relates to Brillouin spectroscopy and microscopy techniques.

BACKGROUND OF THE INVENTION

Brillouin microscopy is an emerging imaging technique that combines confocal microscopy (or other microscopy) and Brillouin spectroscopy to optically measure the mechanical properties of matter.

Brillouin light scattering is an anelastic scattering process that arises from the interaction of light with intrinsic spontaneous acoustic waves (acoustic phonons) of matter. The light elastically diffused (Rayleigh) by a biological system has the same frequency as the lighting light. However, the spectrum contains two sidebands usually designated as Brillouin Stokes (SB) and Anti-Stokes (ASB) peaks that are slightly displaced (1-20 GHz) relative to the Rayleigh frequency. The frequency and width of the Brillouin peaks are indicative of the elastic properties of a sample. In particular, for a known density and refractive index of the material, the Brillouin shift allows the characterization of the longitudinal elastic modulus M' of a material at frequencies of GHz. Standard methods for measuring mechanical properties require physical contact with the sample, which makes these techniques invasive and limited to surface topography. On the other hand, Brillouin microscopy uses light as a probe, without contact and without the need for markers. Brillouin microscopy measures the mechanical properties with a sub-micrometric optical resolution and performs three-dimensional measurements in the volume of biological systems (e.g. cells and tissues). Since the biomechanical properties are critically involved in many diseases such as atherosclerosis, cancer and glaucoma, Brillouin microscopy has enormous potential as a new diagnostic tool in the biomedical field. Up to now, confocal Brillouin microscopy has allowed a wide range of biomechanical studies, including in-vivo biomechanical eye assessment, atherosclerotic plaque stiffness quantification, bacterial meningitis screening, and 3D investigation of cellular biomechanical properties and their variation in response to external chemical stimuli.

The key component in Brillouin microscopy is the spectrometer, which requires a sub-GHz spectral resolution and high spectral contrast. A high spectral contrast is in fact required for the measurement of turbid biological samples where the elastically diffused light and the reflections are many orders of magnitude higher than the weak Brillouin signal. When the light of the elastic background exceeds the contrast of the spectrometers, there are parasitic crosstalks along the dispersion axis that easily overtop the weak Brillouin peaks. In Brillouin spectroscopy, the sample is illuminated by a laser source and the scattered light (that is, the light deriving from the scattering phenomenon) is spectrally analyzed using several Fabry-Perot interferometers (FP) arranged in tandem. Despite their remarkable spectral resolution and contrast, interferometers and etalon FP typically require a long integration time (>1 sec), which in turn limits Brillouin spectroscopy to single point measurements. In recent decades, a new type of high-throughput FP etalon has been introduced, known as Virtually Imaged Phased Array (VIPA). The VIPA is a solid etalon in which the light scattered by the sample is coupled through an anti-reflective coated window (AR) and the spectral interference pattern resulting from multiple cavity reflections is acquired in a single frame by a high sensitivity CCD camera, and therefore without the need for FP scanning. The application of VIPA spectrometers in Brillouin spectroscopy has resulted in data acquisition time from tens of seconds to approximately 100 ms with minimal optical power demand (<10 mW), in turn allowing the implementation of punctual Brillouin spectroscopy in a three-dimensional contactless imaging mode to map the viscoelastic biomechanical properties in the volume of biological systems. Despite their unmatched throughput efficiency, conventional VIPA spectrometers are naturally limited by a spectral contrast of approximately 30 dB. This limit is a consequence of an unbalanced amplitude of the output/transmitted beam, which leads to reduced visibility of the fringes. Current methods to increase the spectral contrast in Brillouin microscopy involve the use of multi-stage VIPA etalon arranged in tandem. However, this happens at the expense of a significantly reduced throughput efficiency of ~25% (in the case of 2 VIPAs), with an associated increase in image acquisition time. In addition, VIPA multi-stage spectrometers require a large number of optical components, which makes such systems expensive and difficult to align. A feasible method has been proposed to increase the contrast of a single etalon VIPA spectrometer, which method uses apodization schemes. However, these schemes result in a high level of losses or have limited contrast gains (~15 dB). Other techniques lead to increased extinction by suppressing the elastic background light. However, these techniques do not increase the effective contrast of the spectrometer.

SUMMARY OF THE INVENTION

In light of the above, the need is felt to develop rapid devices with high spectral contrast, which are suitable for carrying out bio-measurements with Brillouin microscopy.

The invention therefore proposes a spectrometer comprising
  at least one Virtually Imaged Phased Array member—VIPA, configured to receive an input electromagnetic radiation and generate an output electromagnetic radiation, wherein a spectrum of the output electromagnetic radiation is dispersed along a dispersion axis transverse to an optical axis of propagation of the output electromagnetic radiation,
  a Fourier lens adapted to convert the output electromagnetic radiation into a spectral pattern on a spectral plane placed at a distance from the Fourier lens equal to the focal length of the Fourier lens, and
  an image sensor adapted to detect said spectral pattern, and
  at least one diffraction mask arranged along the optical axis for propagating the electromagnetic exit radiation, in a position not coinciding with the spectral plane, said diffraction mask comprising a material blocking the transmission of the electromagnetic radiation, and through which an aperture is obtained which allows the transmission of the electromagnetic radiation, said opening having a polygonal shape and having an edge comprising at least one segment inclined, with respect to said dispersion axis, by an angle α such that $10° \leq α \leq 80°$.

The use of a diffraction mask allows to rotate/deflect the elastic crosstalk line, thus removing most of the elastic light from the dispersion axis where the inelastic Brillouin peaks are created. This allows the implementation of a single stage VIPA spectrometer with an extraordinary spectral contrast of ~70 dB, which represents an increase of 10,000 times compared to a single stage and single pass VIPA spectrometer. It should be noted that this performance can be obtained with minimal signal losses (~1.5 dB) and without affecting the resolution of the spectrometer, and furthermore without additional optical or dispersive components (such as lenses, etalon, lattices). This has enormous potential, for example for Brillouin microscopy, where mechanical images can be quickly acquired without the need for complex, costly and low-efficiency spectral devices, thus making the spectral apparatus more efficient, compact and robust than the current ones.

BRIEF DESCRIPTION OF THE DRAWINGS

Further features and advantages of the proposed device will be presented in the following detailed description, which refers to the accompanying drawings, provided only as a nonlimiting example, in which.

DETAILED DESCRIPTION

Figure 1A:
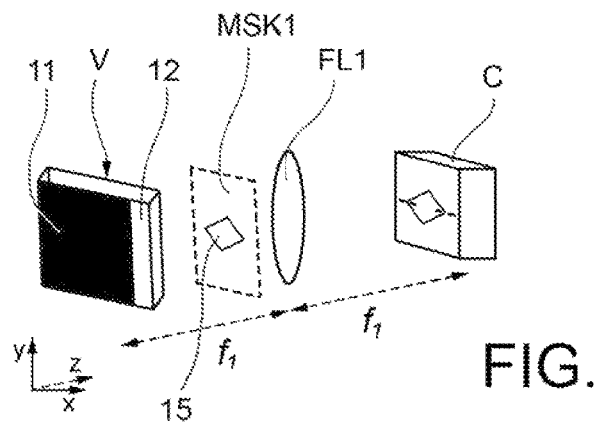
FIGS. 1a-1c are perspective drawings which represent three embodiments of a spectrometer according to the invention.
Figure 2A:
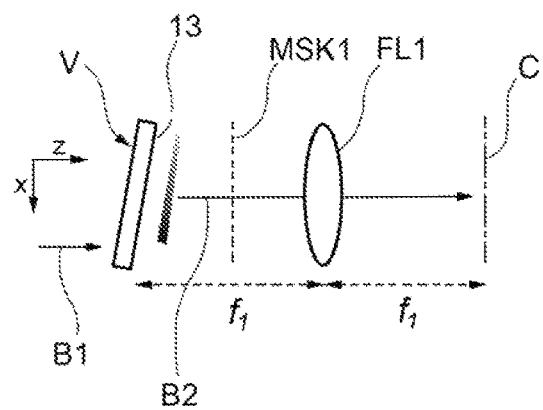
FIGS. 2a-2c are plan views corresponding to FIG. 1a-1c, respectively.

With reference to FIGS. 1a and 2a, a first embodiment of a spectrometer according to the invention is now described.

Such a spectrometer comprises a Virtually Imaged Phased Array element (hereinafter, VIPA element), indicated with V in the figures, which is configured to receive an electromagnetic input radiation B1 and to generate an electromagnetic output radiation B2. When the spectrometer is used in a Brillouin microscope apparatus, the input radiation B1 is the radiation that is triggered by a sample illuminated by a laser beam. The optical axis of propagation of the electromagnetic radiation B2 is represented extending parallel to an axis z of a system of Cartesian axes xyz. The VIPA V member is configured in such a way that the spectrum of the output electromagnetic radiation B2 is dispersed along a transverse dispersion axis with respect to the optical propagation axis of the output electromagnetic radiation B2. The VIPA V member is a particular type of Fabry-Perot etalon, consisting of a solid plate provided with three areas with different reflectivity characteristics. A front surface of the VIPA V member is provided with a first highly reflective coating 11 (in particular with a reflectivity R greater than about 99%) which covers it almost entirely, with the exception of a thin input window 12 with an anti-reflection coating (in particular, R less than about 1%). The back surface 13, parallel to the surfaces 11 and 12, has a highly reflective coating (in particular, R comprised between about 90% and about 99%).

An electromagnetic input beam or radiation, linearly focused by a cylindrical lens (not shown), enters the etalon V with a certain angle with respect to it, through the transparent window 12, it undergoes multiple internal reflections and produces a series of output beams with increasing phase delay, which make up the output radiation B2.

A Fourier lens FL1 is a spherical or cylindrical lens adapted to convert the output electromagnetic radiation B2 into a spectral pattern, which is detected by an image sensor C, for example a CCD (Charge Coupled Device) sensor. In the example in FIGS. 1a and 2a, the distance of the VIPA V member from the lens FL1 and the distance of the lens FL1 from the sensor C are equal to the focal length $f_1$ of the lens FL1. The sensor C is therefore arranged at the spectral plane of the spectrometer.

Figure 3:
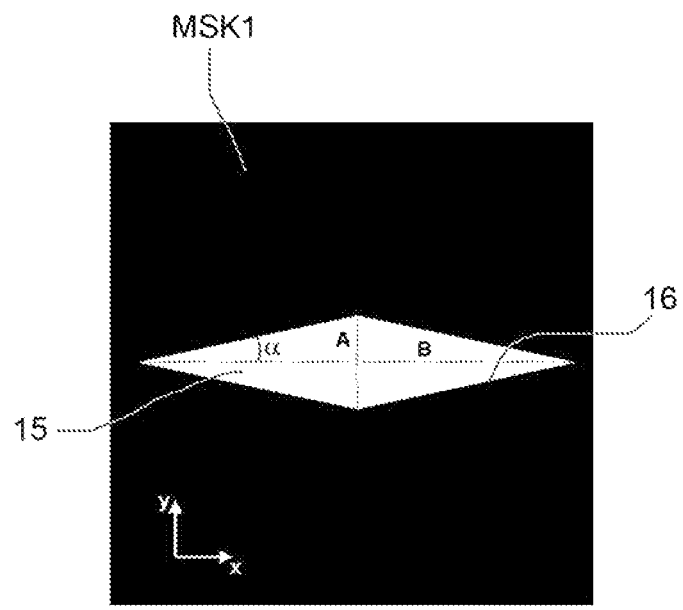
FIG. 3 shows a diffraction mask used in the spectrometers in FIG. 1a-1c.

The spectrometer further comprises at least one MSK1 diffraction mask disposed along the optical propagation axis of the output electromagnetic radiation B2, in a position which does not coincide with the spectral plane of the spectrometer (where no diffraction is generated). With reference also to FIG. 3, the diffraction mask MSK1 comprises a surface of a material (e.g. metal, paper or plastic) which blocks the transmission of the electromagnetic radiation B2, arranged orthogonally to the optical axis z. Through the diffraction mask MSK1 an aperture 15 is obtained which allows the transmission of the electromagnetic radiation B2. The aperture 15 is coplanar with a plane orthogonal to the optical axis z (and therefore parallel to the plane xy), and has an edge 16 comprising at least one segment inclined with respect to the dispersion axis, parallel to the axis x.

In the embodiment shown in FIG. 3, the aperture 15 has a rhomboidal shape. For example, the inventors used an opening of height A~3 mm and width B~7 mm. More generally, with the apparatus used by the inventors the size of the aperture can be included in the ranges of 0.1 mm<A<50 mm and 0.1 mm<B<50 mm. The aperture may have a shape other than the rhomboidal shape, for example square or triangular, provided that there is an edge having at least one section inclined with respect to the dispersion axis.

Figure 1B:
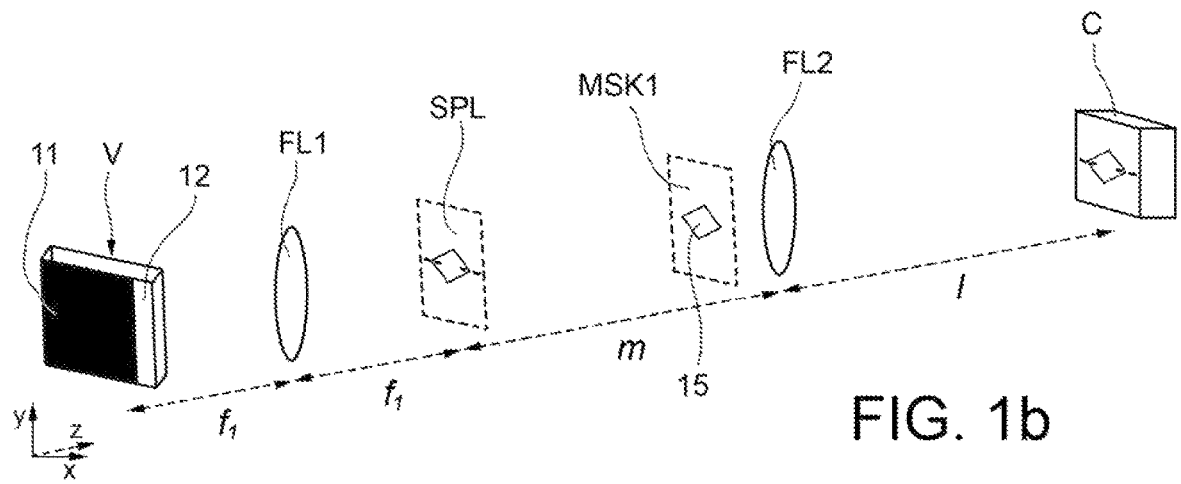
Figure 2B:
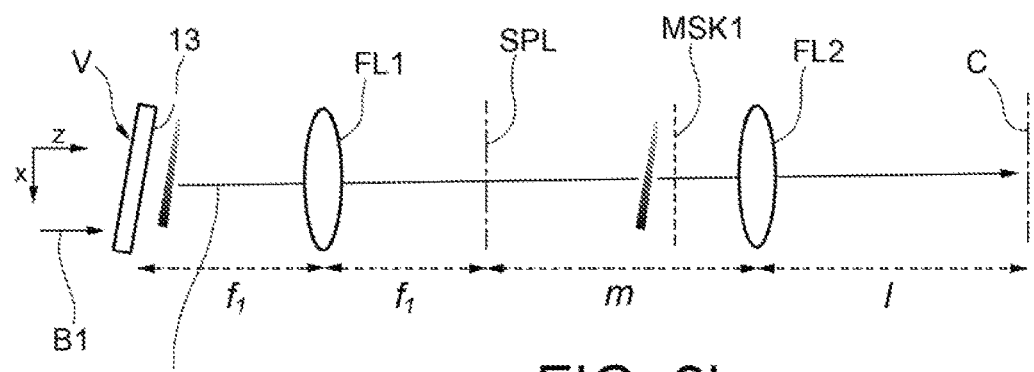

With reference to FIGS. 1b and 2b there is shown a second embodiment of a single stage VIPA spectrometer which includes several Fourier lenses. Elements corresponding to those of the embodiment in FIGS. 1a and 2a have been indicated with the same reference numerals. In the second embodiment, the sensor C is arranged in a plane, conjugated to the spectral plane SPL through an additional Fourier lens FL2 with focal length $f_2$. Lens FL2 may be used to facilitate the removal of elastic peaks (Rayleigh) using spatial filters at the spectral plane SPL, or to obtain an M=l/m magnification of the spectral pattern, where l is the distance of the spectral plane SPL from the second Fourier lens FL2, and m is the distance of the second Fourier lens FL2 from the sensor C.

Figure 1C:
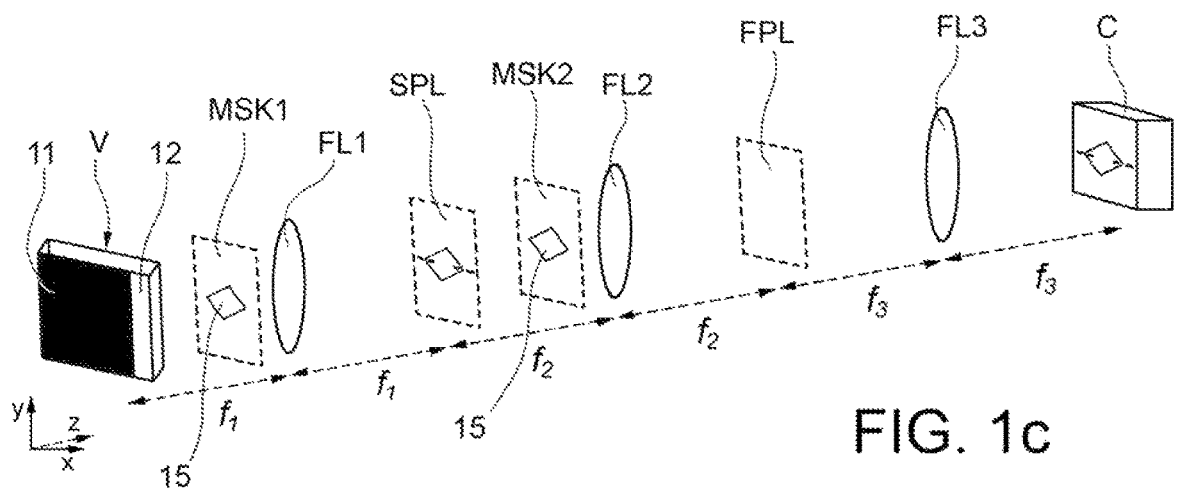
Figure 2C:
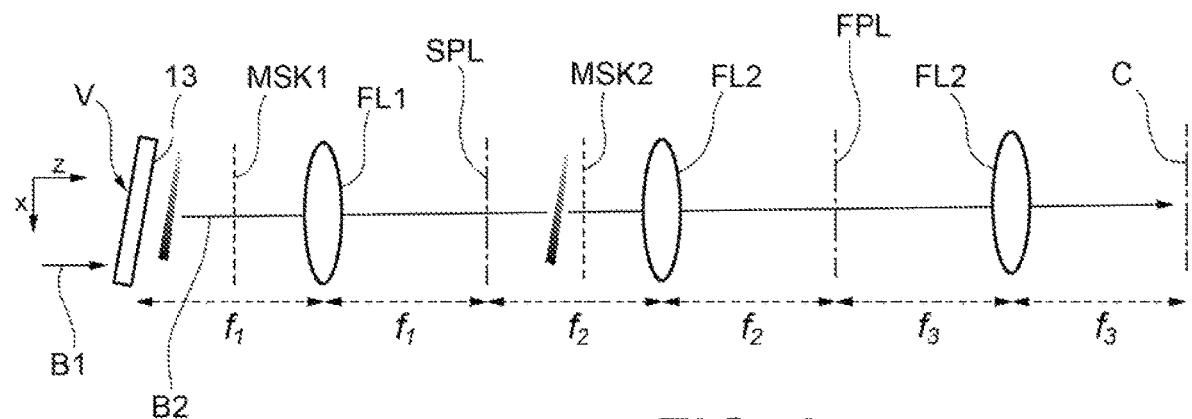

With reference to FIGS. 1c and 2c, a third embodiment of a single stage spectrometer VIPA is shown which adopts an additional configuration 4f. Elements corresponding to those of the embodiments in FIGS. 1a-1b and 2a-2b have been indicated with the same reference numerals.

The spectrometer in FIGS. 1c and 2c comprises a third Fourier lens FL3 with a focal length $f_3$. The additional configuration 4f may be used to arrange a Lyot filter at a Fourier plane (FPL) between the second lens FL2 and the third lens FL3.

As can also be seen in FIGS. 1c and 2c, there is an additional diffraction mask MSK2. More generally, multiple diffraction masks may be used before or after each Fourier lens. In any case, these diffraction masks must not be arranged at the spectral plane SPL where diffraction would not take place.

Figure 10:
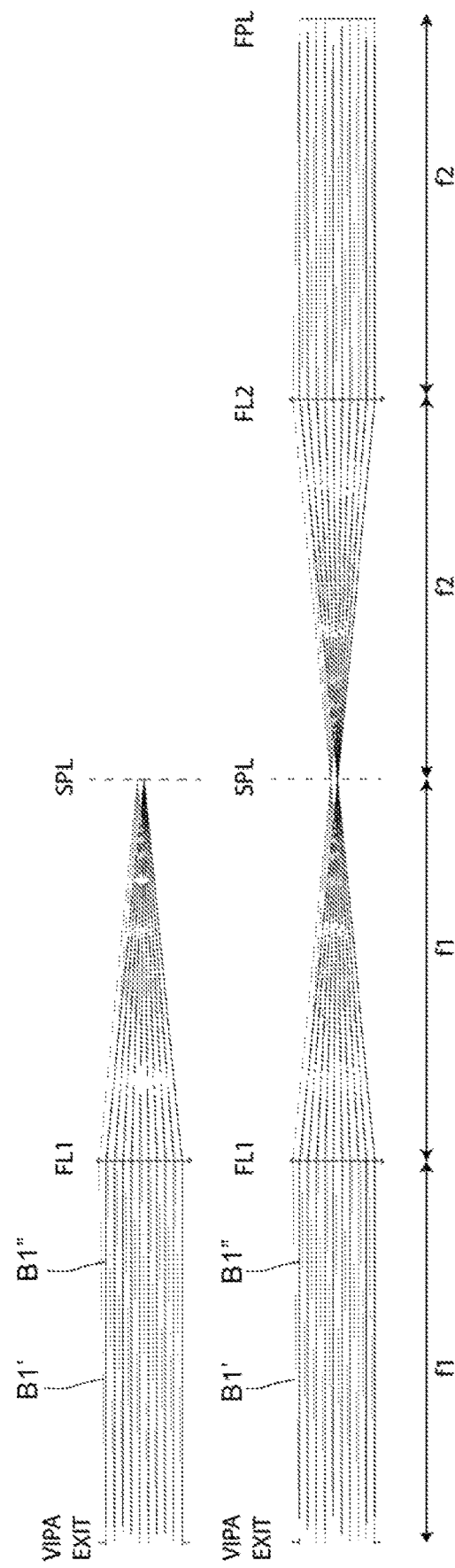
FIG. 10 is a simplified diagram representing the behavior of the beams in output from the VIPA.

With reference to FIG. 10, the operating principle of the present invention is further explained. At the output of the VIPA, beams B1' and B1" with different wavelengths coincide. However, due to the known "dispersion" phenomenon, beams of different wavelengths propagate in space at a different angle (inclined) with respect to each other. Once these beams pass through the Fourier lens FL1, different wavelengths are focused at different points in the space XY precisely because of the different propagation angle. The plane in which beams with different wavelengths are focused at different points is defined, by convention, as a spectral plane (SPL—diagram at the top in FIG. 10). Clearly, if the diffraction mask MSK1 (not shown in FIG. 10) were placed along this plane, it would only have the effect of removing focal points. On the contrary, placing the mask MSK1 outside of SPL, it creates a diffraction effect (due to the deflection of the beams induced by the inclined edge of the mask) that changes the shape of these focal points, thus increasing the contrast.

By inserting a second Fourier lens FL2 at focal distance from SPL, the Fourier plane FPL is created, which is the plane in which beams of different wavelengths are recombined (diagram at the bottom in FIG. 10). A Lyot filter could only work along this plane, while it would have no effect in other positions. In contrast, the diffraction mask of the present invention may be inserted anywhere but outside of SPL.

The output beam of a conventional VIPA etalon is a decaying field exponentially along the output surface of the VIPA, where the rays are transmitted as a result of multiple cavity reflections as in a Fabry-Perot interferometer. At the spectral plane, the exponentially decaying output beam is transformed into a spectral pattern consisting of multiple interference orders of typically Lorentzian form and displaced with each other by a free spectral range (Free Spectral Range—FSR).

The spectrometer contrast is defined as the peak/background ratio along the dispersion axis between two consecutive interference orders. Typical single stage VIPA spectrometers have a contrast of ~30 dB as a consequence of the long frequency queues of Lorentzian peaks. The integration of a diffraction mask along the optical axis z of the spectrometer VIPA has the advantage of diverting the elastic cross-talk lines out of the dispersion axis, thereby increasing the contrast of the spectrometer. As a result, a dispersion axis without the elastic background light is obtained which typically degrades or prevents visibility of the Brillouin spectral peaks.

Figure 4A:
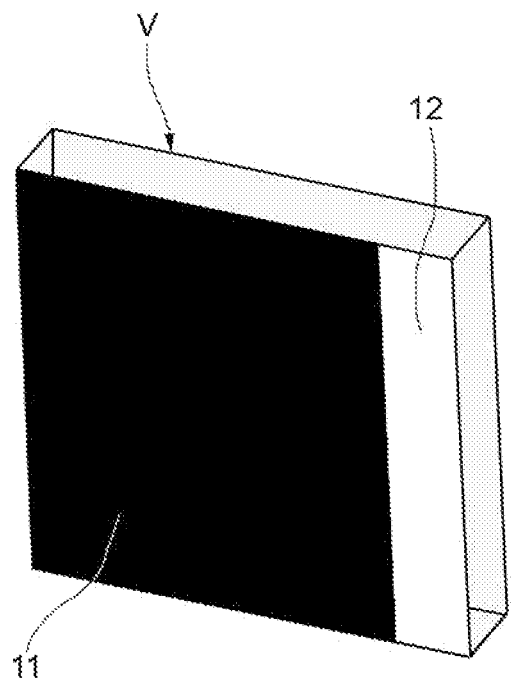
FIGS. 4a and 4b show perspective views, from the input side and from the output side, respectively, of an embodiment according to which an etalon VIPA is provided with the mask in FIG. 3.
Figure 4B:
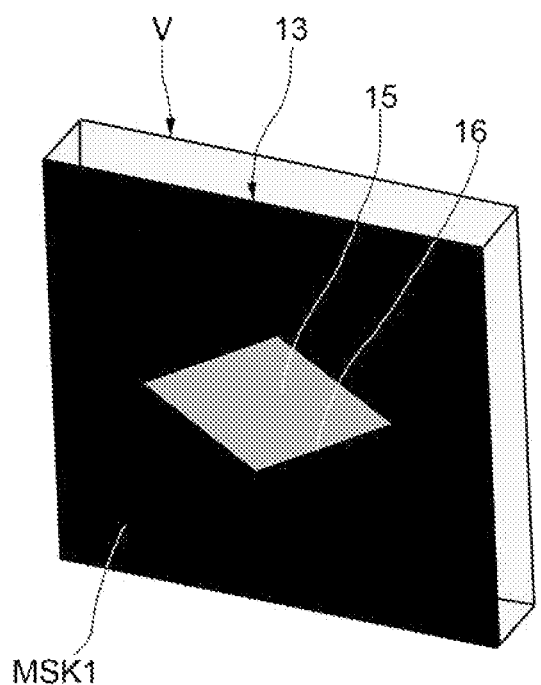

FIGS. 4a and 4b show an embodiment in which a diffraction mask MSK1 is integrated directly onto the output surface 13 of the VIPA V etalon, using a high reflectivity coating (R greater than about 99%) with an aperture 15 with lower reflectivity (R between about 90% and about 99%) of the desired shape. This would reduce the level of optical losses that occur when using an outer mask in free space, and would also make a more compact unit available without the need for external diffraction masks.

Figure 6:
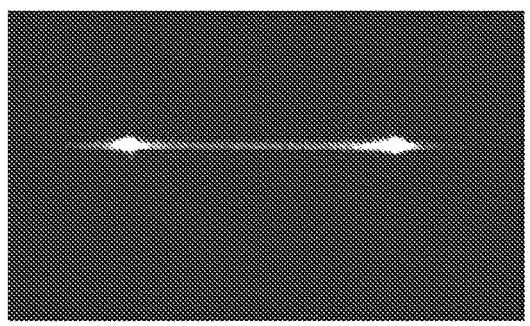
FIG. 6 shows spectral patterns at the spectral plane of a conventional VIPA spectrometer (left column) and of a VIPA spectrometer according to the invention (right column). While for a conventional configuration the crosstalk signal occurs along the dispersion axis (i.e. the axis which intersects the multiple interference orders, which in the illustrated example coincides with a horizontal axis), the diffraction induced by the opening mask leads to a deviation of the elastic crosstalk signals along lines oriented away from the dispersion axis. By increasing the intensity of the laser beam by 10 times, the dispersion axis is completely overtopped by the elastic background in the conventional configuration (bottom left pane). On the other hand, the dispersion axis is completely devoid of elastic background light (bottom right pane)
Figure 6:
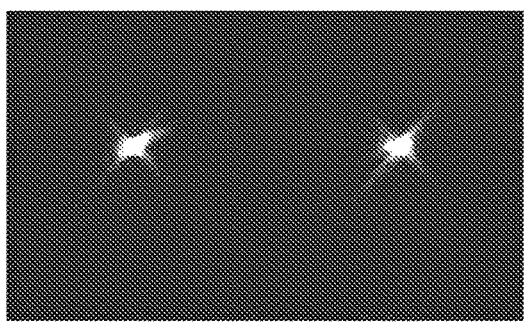
Figure 6:
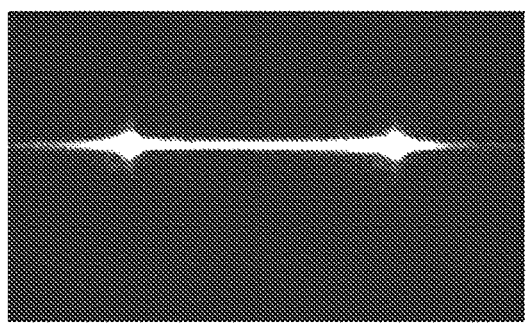
Figure 6:
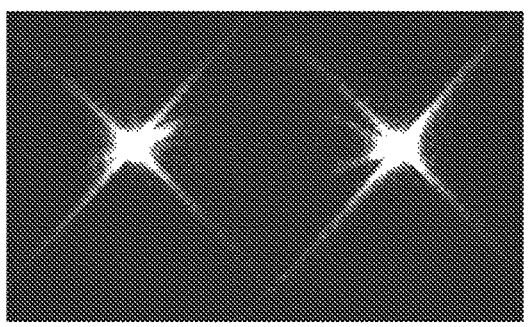

FIG. 6 shows a comparison between the spectral pattern obtained with a conventional VIPA spectrometer and a VIPA spectrometer according to the invention (in the configuration in FIGS. 1a and 2a). In the conventional spectrometer VIPA, the dispersion axis has an elastic cross-talk signal that increases by increasing the data acquisition time of the sensor C. On the other hand, the spectral pattern of the spectrometer VIPA according to the invention has multiple cross-talk lines which occur at a certain angle with respect to the dispersion axis.

Figure 7:
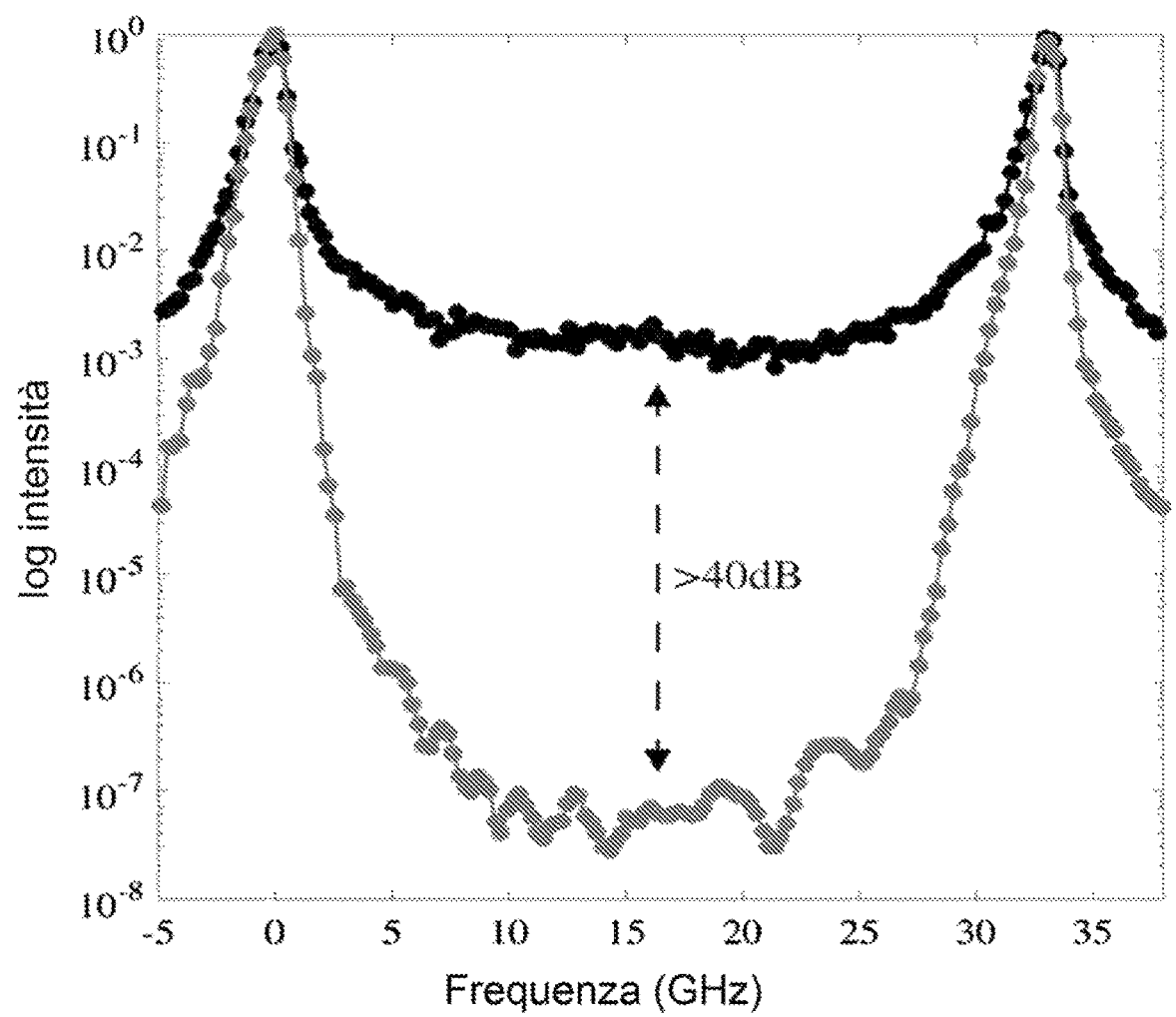
FIG. 7 shows spectral profiles reconstructed along the dispersion axis. While the conventional spectrometer (black trace) shows an expected contrast of ~30 dB along a free spectral range (0-33 GHz in the present configuration), the spectrometer VIPA according to the invention (gray trace) shows a contrast up to 70 dB corresponding to an increase of more than 40 dB.

FIG. 7 shows the intensity profiles reconstructed (in logarithmic scale) along the dispersion axis of the conventional spectrometer VIPA and of the spectrometer VIPA according to the invention, in the configuration in FIGS. 1a-c 2a-c. While a conventional configuration (without diffraction masks) provides a contrast of about $10^3$ (30 dB), the application of the diffraction mask involves a contrast of $10^7$ (70 dB), which corresponds to a 10,000-fold increase compared to the normal case.

Figure 8:
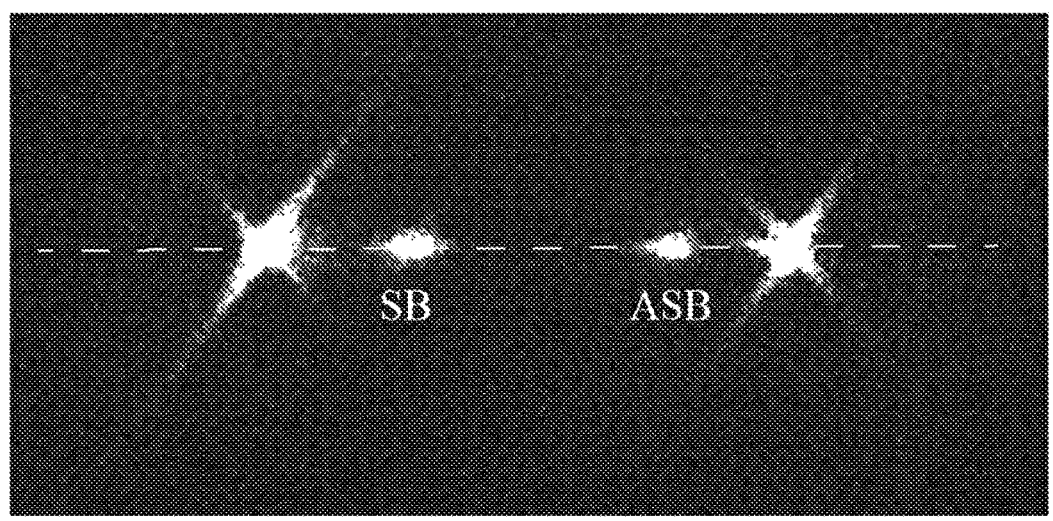
FIG. 8 shows a Brillouin spectral pattern of water acquired with the spectrometer VIPA according to the invention, with a data acquisition time of 100 ms and ~10 mW at the sample plane. The Brillouin Stokes (SB) and Anti-Stokes (ASB) peaks are clearly visible along the dispersion axis (dotted line). All the elastic background light originating from specular reflections and Rayleigh scattering is distributed along lines that do not intersect the dispersion axis.
Figure 9:
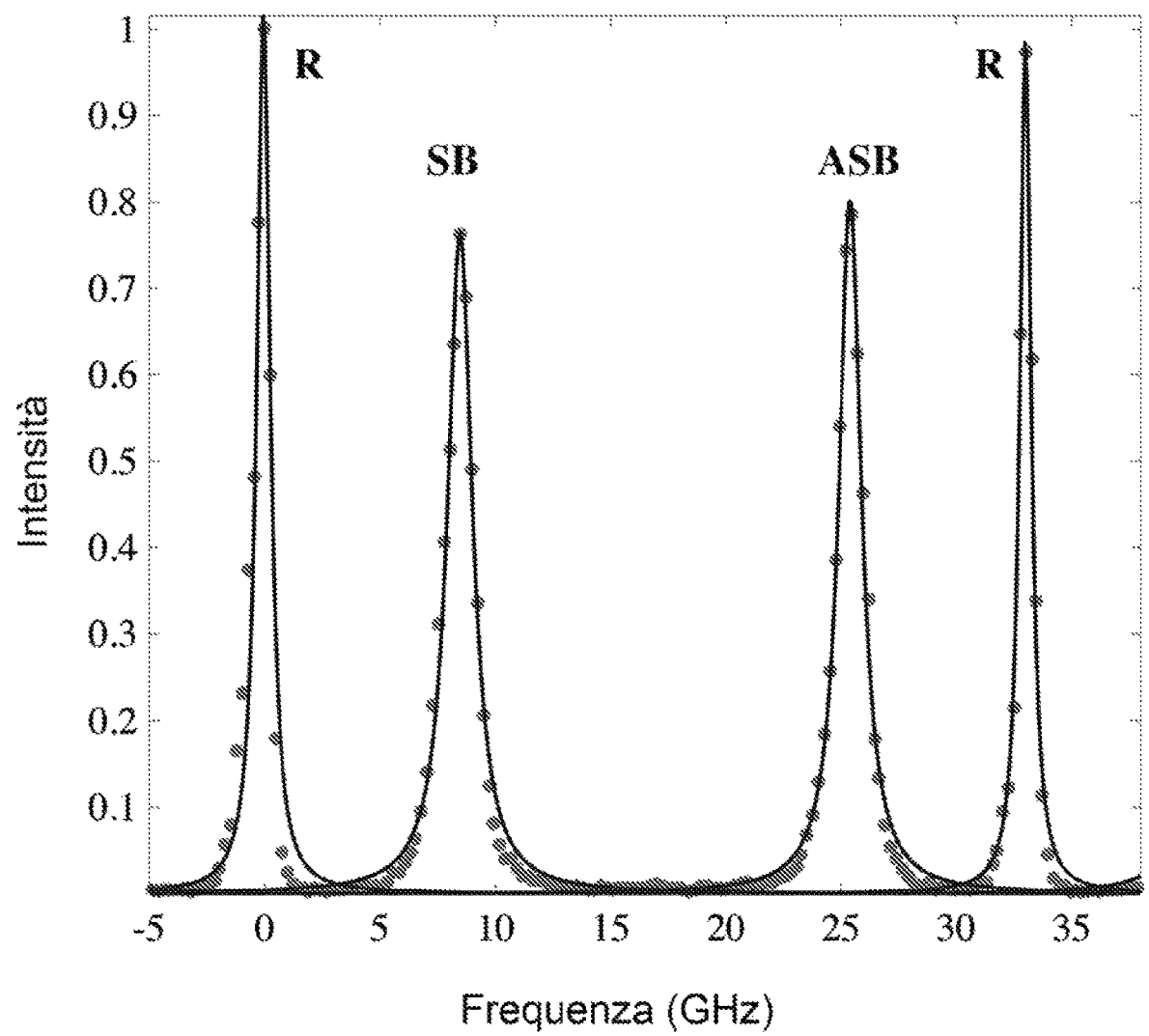
FIG. 9 represents the spectral intensity profile along the dispersion axis in FIG. 8.

The unprecedented contrast shown here can be used to acquire the Brillouin spectrum of biosystems. FIG. 8 shows a Brillouin spectrum of water acquired with the single stage and single pass spectrometer VIPA according to the invention, and FIG. 9 shows the intensity profile along the dispersion axis in FIG. 8. The Brillouin Stokes SB and AntiStokes Brillouin ASB peaks are clearly visible along the dispersion axis (dashed line in FIG. 8), as a result of the deviated cross-talk lines. The increased contrast from diffraction masks results in a minimal reduction in throughput efficiency without affecting the spectral resolution of the spectrometer VIPA.

Figure 5:
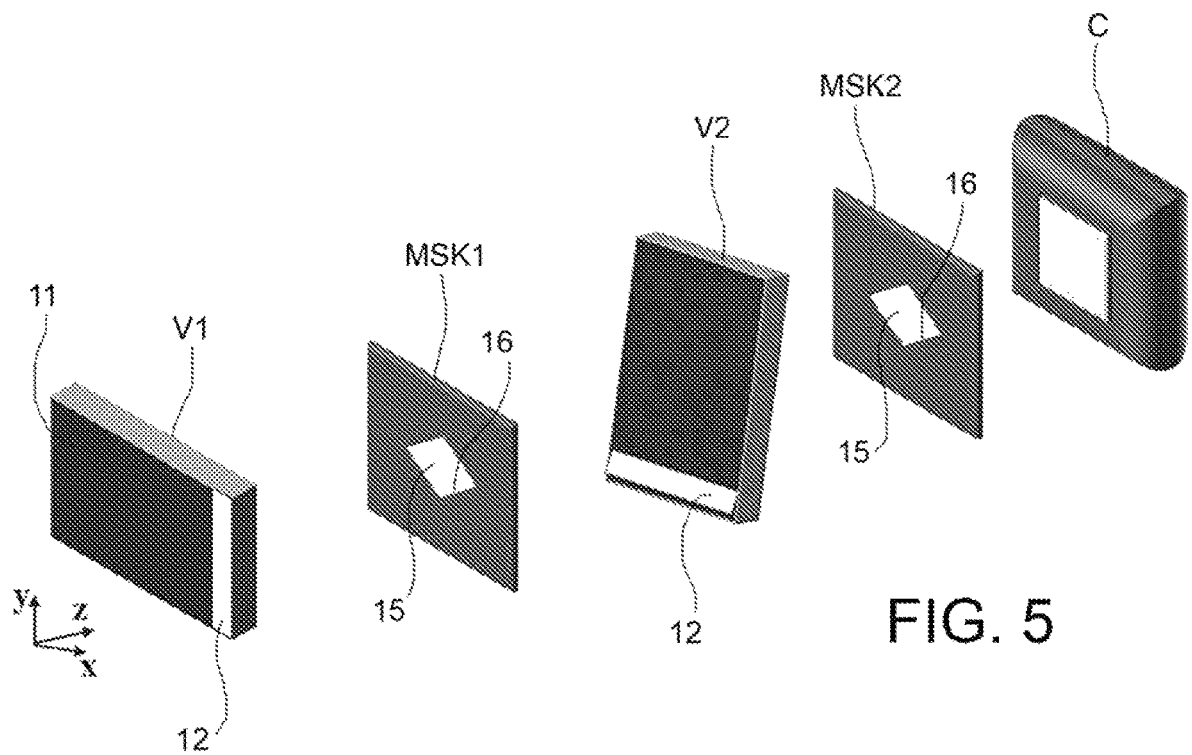
FIG. 5 is a perspective diagram representing a further embodiment of a spectrometer according to the invention.

The present invention provides an optimal configuration for a single stage VIPA etalon. Nevertheless it is not limited to this case, and can be extended to multi-stage VIPA etalon that would increase the spectral contrast by at least 30 dB without using diffractive masks. A diagram of a two stage VIPA configuration, with two VIPA V1 and V2 etalon in series whose dispersion axes are oriented perpendicular to each other, is shown in FIG. 5. One or more Fourier lenses (not shown) are provided for transforming the output beam of each of the V1 and V2 etalon into a spectral pattern. Diffraction masks MSK1 and MSK2 are added before and after the second VIPA V2 etalon, outside the spectral plane of the spectrometer.

In the system in FIG. 5, the deflection of the elastic background light allows the coupling of the desired spectral signal only in the second etalon V2, further increasing the contrast of the spectrometer.

The invention claimed is:

1. A spectrometer comprising
at least one Virtually Imaged Phased Array member, hereinafter VIPA member, configured to receive an input electromagnetic radiation and generate an output electromagnetic radiation, wherein a spectrum of the output electromagnetic radiation is dispersed along a dispersion axis (x) transverse to an optical axis (z) of propagation of the output electromagnetic radiation,
a Fourier lens adapted to convert the output electromagnetic radiation into a spectral pattern on a spectral plane placed at a distance from the Fourier lens equal to the focal length ($f_1$) of the Fourier lens, and
an image sensor adapted to detect said spectral pattern,
wherein the spectrometer further comprises at least one diffraction mask arranged along the optical axis (z) for propagating the output electromagnetic radiation, in a position not coinciding with the spectral plane, said at least one diffraction mask comprising a material blocking transmission of the output electromagnetic radiation, and through which an aperture is obtained which allows the transmission of the output electromagnetic radiation, said opening having a polygonal shape and having an edge comprising at least one segment inclined, with respect to said dispersion axis (x), by an angle $\alpha$ such that $10° \leq \alpha \leq 80°$.

2. The spectrometer of claim 1, wherein the image sensor is arranged at the spectral plane.

3. The spectrometer of claim 1, further comprising at least one further Fourier lens arranged between the spectral plane and the image sensor, said at least one further Fourier lens being configured to magnify the spectral pattern on the image sensor.

4. The spectrometer of claim 1, further comprising a second Fourier lens arranged between the spectral plane and the image sensor, a spatial filter being arranged at the spectral plane.

5. The spectrometer of claim 1, further comprising a second Fourier lens and a third Fourier lens arranged between the spectral plane and the image sensor, a Lyot filter being arranged at a Fourier plane between the second Fourier lens and the third Fourier lens.

6. The spectrometer of claim 1, wherein the at least one diffraction mask is formed on an output surface of the VIPA member.

7. The spectrometer of claim 1, comprising two VIPA members arranged along the optical axis (z), and whose dispersion axes are oriented orthogonally to each other.

8. Apparatus for Brillouin microscopy comprising the spectrometer of claim 1.

* * * * *